United States Patent [19]

Michels et al.

[11] Patent Number: 4,607,715

[45] Date of Patent: Aug. 26, 1986

[54] PROPORTIONAL PNEUMATIC CONTROL SYSTEM FOR AIRCUSHIONS

[75] Inventors: Hartwig Michels; Knud Klingler, both of Nuremberg, Fed. Rep. of Germany

[73] Assignee: Delu-Luftkissentransportgeratetechnik GmbH, Fed. Rep. of Germany

[21] Appl. No.: 679,629

[22] Filed: Dec. 10, 1984

[30] Foreign Application Priority Data

Jan. 3, 1984 [DE] Fed. Rep. of Germany ....... 3400101

[51] Int. Cl.[4] ............................................. B60V 1/11
[52] U.S. Cl. ..................................... 180/118; 180/119; 180/125
[58] Field of Search ............... 180/117, 118, 119, 125; 104/23 FS, 134, 284, 293; 114/67 A; 108/147

[56] References Cited

U.S. PATENT DOCUMENTS

| | | | |
|---|---|---|---|
| 3,648,799 | 3/1972 | Young et al. | 180/118 |
| 3,757,699 | 9/1973 | Wirth | 104/23 FS |
| 3,791,477 | 2/1974 | Burdick | 180/117 |
| 3,889,775 | 6/1975 | Luscher | 180/118 |
| 3,994,540 | 11/1976 | Petersen | 308/3 R |

FOREIGN PATENT DOCUMENTS 3107341  9/1982  Fed. Rep. of Germany ... 104/23 FS

Primary Examiner—John A. Pekar
Assistant Examiner—Everett G. Diederiks
Attorney, Agent, or Firm—Steele, Gould & Fried

[57] ABSTRACT

A controller operative to adjust the supply of compressed air to aircushions, in response to changes in load, includes a pneumatically-driven pressure regulator and damped means to accumulate or vent control pressure in response to a sensed distance between the carrier frame and a gliding surface.

11 Claims, 5 Drawing Figures

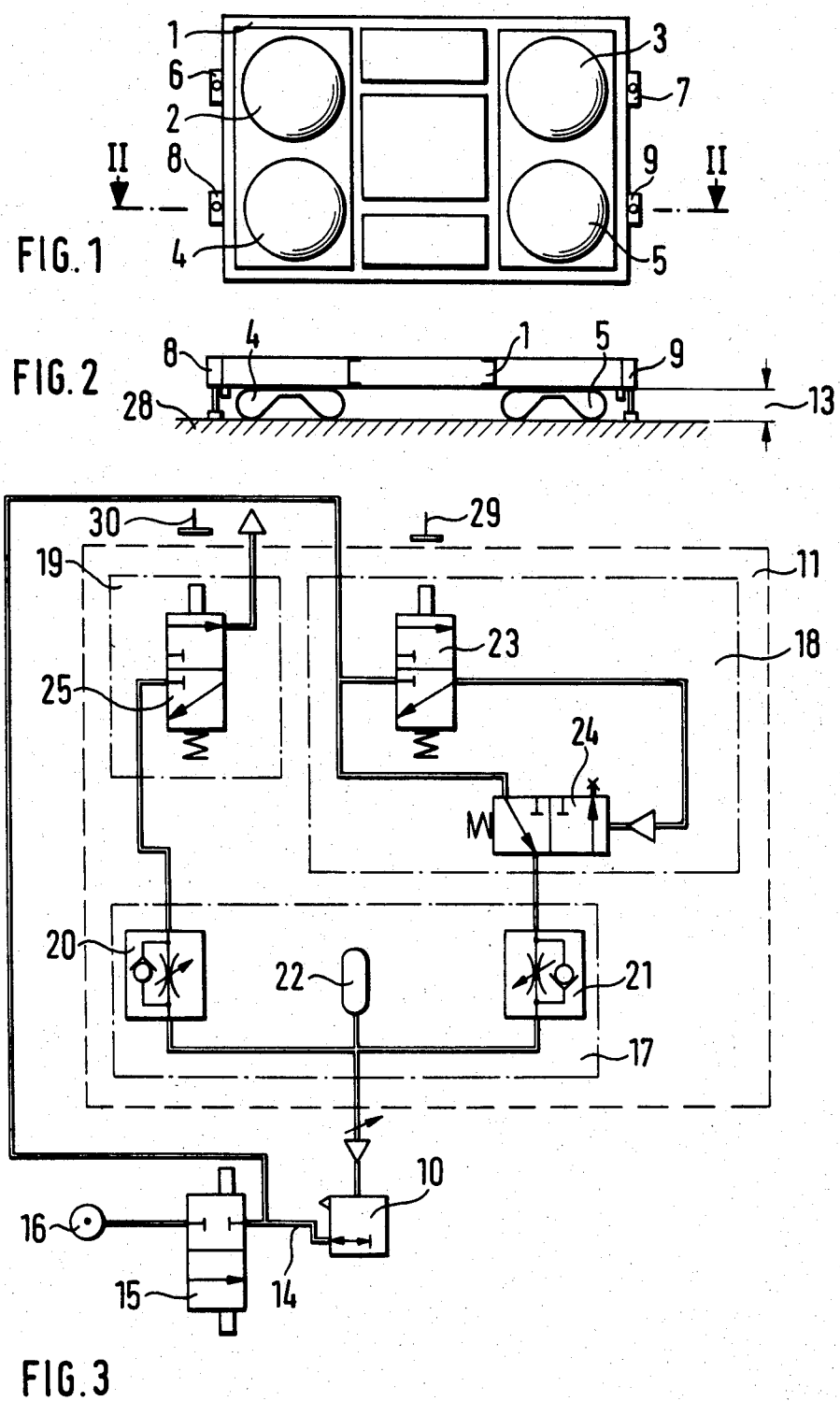

PROPORTIONAL PNEUMATIC CONTROL SYSTEM FOR AIRCUSHIONS

BACKGROUND OF THE INVENTION

1. Field of the Invention

The invention relates to the field of position control systems, and in particular to a compressed air control system adapted for controlling the supply of compressed air to an aircushion.

2. Prior Art

A compressed air control system is known from U.S. Pat. No. 3,648,799—Young et al in which a control unit opens and closes a pressure regulator in response to a position-sensing transmitter. The sensing and control mechanism according to that publication is sensitive to pressure fluctuations leading to a fluttering of the aircushion, and an automatically-controlled valve reduces the pressure supplied to the cushion until a stable condition is obtained once again.

U.S. Pat. No. 3,994,540—Petersen teaches a pressure compensating frame which controls the pressure supplied to the aircushions in response to sensed distance from a gliding surface such as a floor.

The present invention is adapted not only to control the air supply to the aircushions in response to the distance from a gliding surface, but also to do so in a manner that is free from oscillations, as well as responsive to differences in load and differences in roughness of the gliding surface.

SUMMARY OF THE INVENTION

It is an object of the invention to control the air supplied to an aircushion device in order to maintain a preset distance between the device and a gliding surface.

It is also an object of the invention to maintain such a preset distance with a quick-responding control that is not prone to oscillations and pressure fluctuations.

These and other objects are accomplished by a controller operative to adjust the supply of compressed air to aircushions, in response to changes in load, including a pneumatically-driven pressure regulator and damped means to accumulate or vent control pressure in response to a sensed distance between the carrier frame and a gliding surface.

BRIEF DESCRIPTION OF THE DRAWINGS

There are shown in the drawings the embodiments which are presently preferred, it should be understood, however, that the invention is not limited to the precise arrangements and instrumentalities shown in the drawings, wherein:

FIG. 1 is a plan view of an aircushion carrier frame according to the invention, seen from below;

FIG. 2 is a section view taken along line II—II in FIG. 1; and,

FIG. 3 is a schematic diagram of an automatic compressed air control system according to the invention, showing controller 11 in detail;

DETAILED DESCRIPTION OF THE PREFERRED EMBODIMENTS

Figure 4:
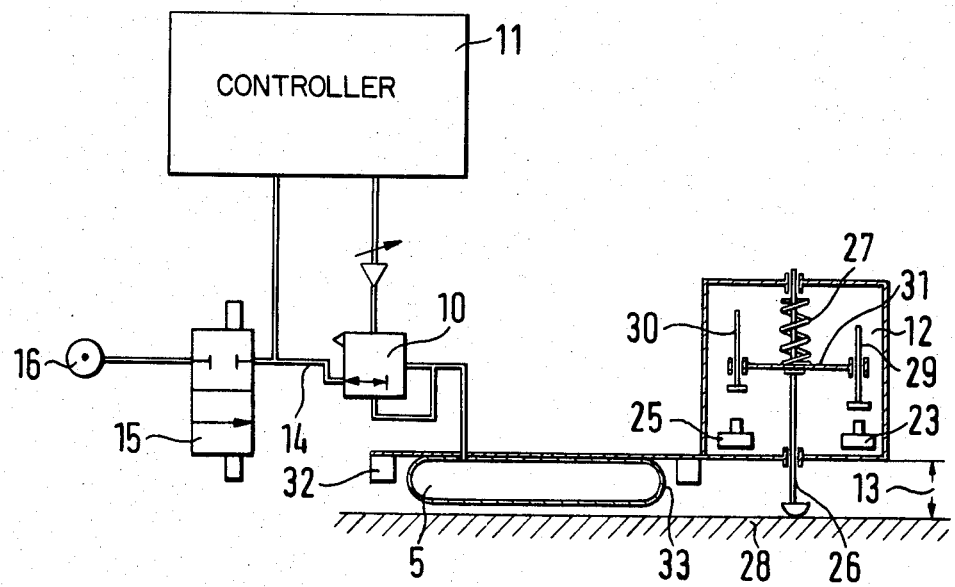
FIG. 4 is a schematic diagram of the system, showing transmitter 12 in detail; and, FIG. 5 is a section view of an alternative embodiment.

An aircushion carrier frame according to the invention is shown in FIGS. 1 and 2. Frame 1 carries four aircushions 2, 3, 4, 5, which can be inflated to lift the carrier frame 1 above the gliding surface 28, excess air escaping around the bottoms of the aircushions. In the illustrated embodiment, each aircushion 2, 3, 4, 5 is provided with an automatic compressed air controlling device 6, 7, 8, 9, respectively. It is also possible to control two or more aircushions with one compressed air control device according to the invention.

Each of the one or more automatic compressed air controlling devices 6, 7, 8, 9 is provided with a pressure regulator 10, as shown in FIG. 3. Regulator 10 can be controlled through a controller 11 in response to a transmitter 12, which senses the current stroke length 13, i.e., the elevation or distance between the carrier frame 1 and the gliding surface 28. On the supply side, each pressure regulator 10 is connected to a supply line 14 and shut-off valve 15, regulator 10 supplying a regulated amount of compressed air to the interior of the associated individual aircushion or cushions 2, 3, 4, 5.

The controller 11 is a pneumatic control associated with the pressure regulator 10 and include a compensating device 17 which is connected to the compressed air source 16, downstream of the shut-off 15, and also connected to a venting device 19. The compensating device 17 has two adjustable throttle-check valves 20, 21 and a storage unit 22 for the compressed air. Compensation device 17 adjusts the responsiveness or damping delay of the system. Controller 11 drives pressure regulator 10 in response to input supplied to controller 11 from transmitters 12. Shut-off portion 18, vent 19 and compensating device 17 are operative to maintain the stroke length 13 within the desired range by controlling inflation of aircushions 2, 3, 4, 5, through pressure regulator 10.

The shut-off device 18 comprises a mechanically-controlled distributing valve 23 and a pneumatically-controlled distributing valve 24. The distributing valves each are of a type having three input positions and two output positions, however, valve 23 is mechanically driven by the transmitter and valve 24 is pneumatically-driven by the output of valve 23. The venting device 19 also comprises a distributing valve having three inputs and two outputs, and is also mechanically driven.

In the illustrated example, the transmitter 12 is a mechanical valve-operating element having means to indicate maximum and minimum elevations, i.e., distances for the stroke length 13. Ram 26 is a flexible feeler element, biased by a spring 27 to remain in contact with the floor or gliding surface 28. Two switching rods 29, 30 are attached to ram 26 and held in place by guide 31. Rods 29, 30 are of differing working lengths, reflecting the maximum and minimum elevation of carrier 1 above gliding surface 28. Each switching rod drives a valve. The switching rod 29 is placed such that as elevation or stroke length 13 increases, at a stroke distance determined by the effective length of the switching rod 29, the rod operates distributing valve 23 of the shut-off device 18. The position of rod 29 is adjustable and is preferably placed such that rod 29 operates distributing valve 23 at the fully-inflated operating position of the respective aircushion 5. When distributing valve 23 is operated by rod 29, control pressure is supplied to pneumatic distributing valve 24, thereby closing valve 24 and stopping further accumulation of air pressure in pressure storage reservoir 22. In this situation, the pressure regulator 10 has a constant control pressure applied from pressure storage reservoir 22, and accordingly maintains a constant operating pressure in aircushion 5.

Should the elevation or stroke length increase further up to a preset maximum value, which value is set by adjusting the effective length of switching rod 30, then rod 30 opens the mechanically-operated distributing valve 25, whereupon venting device 19 releases control air pressure from pressure storage reservoir 22, thereby lowering the control pressure applied to regulator 10 and consequently lowering the air pressure supplied to aircushion 5.

Control system 9 for the aircushion 5 operates, for example, as follows. When the carrier is inoperative, the control pressure to regulator 10 as well as the output air supplied to aircushions 2, 3, 4, 5 is zero, i.e., atmospheric pressure. The carrier frame 1 with its collapsed aircushions 2, 3, 4, 5, then rests on its edge supports 32 against the floor or gliding surface 28. The aircushion device is made operative by connecting a compressed air source 16 thereto by means of shut-off valve 15. Compressed air from the source then is applied to the input of pressure regulator 10, and also to the controller 11.

Over a brief time, the control pressure continuously increases in controller 11, increasing the control pressure applied to the pressure regulator 10, and causing an increasing supply of air to aircushion 5. The control pressure continues to accumulate so long as mechanical distributing valve 23 is closed. Pneumatic distributing valve 24 therefore remains open, and control air is applied to pressure regulator 10 and accumulated in pressure storage reservoir 22. The control air reaches regulator 10 and pressure storage reservoir 22 through throttle and check valve 21. The air could pass through a second throttle and check valve 20, located on the vent line, however, venting apparatus 19 and its mechanically-operated distributing valve 25 remain closed. Accordingly, air accumulates in pressure storage reservoir 22 and is applied against pressure regulator 10. Meanwhile, as more and more control pressure is applied to pressure regulator 10, the associated aircushion inflates.

Eventually the preset operating stroke length is reached, whereupon the distributing valve 23 is operated by contact with switch rod 29. Control pressure is then applied within shut-off unit 18 to change the position of pneumatically-operated distributing valve 24, and to stop the accumulation of control pressure through shut-off unit 18. Throttle and check valve 21 prevents any loss of control air from pressure storage reservoir 22.

As seen in the detailed illustration of shut-off device 18 shown in FIG. 3, the closing of pneumatically-controlled valve 24 closes the supply of additional control air to pressure regulator 10 so that no further build-up of control pressure can take place. However, the current control pressure is maintained by means of pressure storage reservoir 22. The control pressure, and therefore the regulated output pressure from pressure regulator 10, are limited to values depending upon the length of stroke 13. These pressures are also affected by the load placed on carrier 1 in that the control adjusts the operating air pressure flow as a function of the load applied to the carrier frame 1 in order to achieve the preset elevation.

FIG. 4 shows the controller 11 generally, and the transmitter 12 in detail. Maximum and minimum deflection valves 23, 25, responsive to relative movement of ram 26, cause the slow increase and decrease of control air in the pressure storage reservoir 22 of controller 11.

Commonly available commercial pressure regulators are sometimes provided with an opening to the control chamber which vents the control chamber to the atmosphere. This opening allows the control pressure to bleed slowly away. According to the invention, pressure storage reservoir 22 delays the drop in air pressure due to the bleeding away of control pressure. A pressure regulator 10 with an airtight control chamber can also be provided. In that case, when the compressed air supply is shut-off through distributing valve 24, the control pressure will remain substantially constant, and regulator 10 will thereby keep the pressure of the air supply to the aircushion constant.

In addition to a control dependent upon changes in the load applied to frame 1, the control is also effective to offset uneven losses of air from the air cushions, maintaining the preset elevation. If an aircushion 5 is moved from a smooth gliding surface 28 to a rougher, more uneven surface, for example one having more cracks or discontinuities, the rate of loss of air from aircushion 5 increases. The additional loss of air causes the aircushion 5 to partially collapse, and thereby decreases the stroke length 13. Accordingly, switching rod 29 allows distributing valve 23 to open, which in turn allows pneumatic distributing valve 24 to open. Therefore, the control pressure builds up. The pressure build-up is damped against oscillation by throttle-check valve 21, and also by the additional time required to fill pressure storage reservoir 22. Nevertheless, the control pressure builds up and the compressed air flow supplied to aircushion 5 by regulator 10 increases to compensate for the additional roughness of the floor, loss of air and the like. Eventually, the pressure regulator supplies air at a rate that offsets the loss of air due to the rougher floor, whereupon the shut-off device 18 is once again operated as described.

Upon passing back from the rough floor to the smooth floor, the length 13 increases because the loss of air from aircushion 5 no longer offsets the air supply by pressure regulator 10. Accordingly, aircushion 5 overinflates until switching rod 30 operates the mechanical distributing valve 25 of vent 19, and allows control pressure to escape through throttle check valve 20 and the now-opened distributing valve 25. Control pressure and aircushion pressure are reduced until the desired stroke length 13 is again obtained, at which point switching rod 30 becomes disengaged from distributing valve 25, which again closes.

The throttle check valves 20, 21 and also the pressure storage reservoir 22, damp any change in control air pressure, either increase or decrease, to prevent oscillation of the frame 1. The responsiveness of the control can be adjusted by increasing or decreasing the strength of control air supply and/or venting by means of adjusting throttle-check valves 20, 21.

Should a transport frame have unevenly-loaded air cushions 2, 3, 4, 5, each of which has an automatic compressed air control device 6, 7, 8, 9, the frame will be self-leveled according to the control of the invention. The aircushion loaded the least and/or losing the least air will obtain the preset length of stroke 13 first, whereupon its control pressure is stabilized, and the aircushions with the most load or most air loss will reach that condition last. In any case, the frame will assume the same height above a gliding surface for each of its corners, regardless of the load and any unevenness of the load.

The compressed air control device according to the invention can be mounted at any convenient location on the frame or aircushions. It is recommended, however, that the control devices be placed symmetrically, so that their weight is balanced. The transmitters 12 are preferably placed at the periphery of the frame, such that fluctuations in leveling or elevation of the frame will cause the greatest change in the position of the switch rods.

Figure 5:
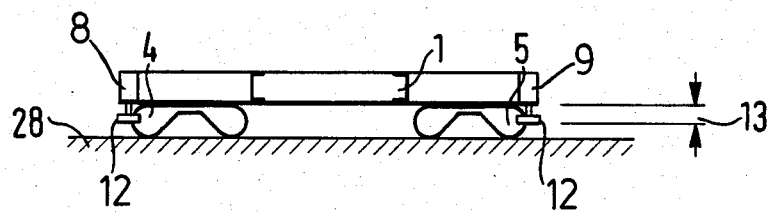

The control of the shut-off device 18 and the venting device 19 can be accomplished in many different ways as well. For example, these valves can be operated electrically, electromagnetically, hydraulically or otherwise. Similarly, transmitter 12 can pick up and transmit electrical, optical, hydraulic or pneumatic control impulses as well as the mechanical impulses illustrated. Instead of control based on the length of stroke 13, which in the illustrated example reflects the distance between the carrier 1 and the gliding surface 28, the transmitter 12 can be made responsive to relative displacement between a carrier location and some predetermined location on the upper outside wall 33 of the inflatable skirt of the aircushion. The transmitter 12 can also be a part of the wall 33. Such an embodiment is shown in FIG. 5.

The invention having been disclosed, a number of additional variations will now occur to persons skilled in the art. Reference should be made to the appended claims rather than the foregoing specification as indicating the true scope of the subject invention.

What is claimed is:

1. A control system for an aircushion carrier having a plurality of air cushions for supporting a carrier above a gliding surface, the air cushions to be controllably connected to a source of compressed air, the control system comprising:
   a pressure regulator for controllably supplying air to the air cushions at an operating pressure determined by a control level applied to the pressure regulator;
   a transmitter for sensing the distance between the carrier and the gliding surface, thereby sensing changes in load;
   a controller connected to the transmitter and operative to adjust the control level applied to said pressure regulator in response to said changes in load on said carrier, the control level being increased and decreased by the controller in response to the transmitter; and,
   an adjustable damping means for the controller, the damping means controlling a rate of at least one of said increase and decrease in the control level.

2. The control system of claim 1, wherein the control level is applied to the controller from a control air supply having a pneumatic pressure storage reservoir, the controller being operative to add and remove air from the reservoir in response to the transmitter sensing the distance.

3. The control system of claim 2, wherein the control air supply is airtight at the pressure regulator.

4. The control system of claim 2, wherein the transmitter is arranged to sense deviation from at least one preset carrier elevation above the gliding surface, the controller being adapted to increase the operating pressure of air supplied to the aircushions by increasing supply of air to said pressure storage reservoir until the preset carrier elevation is reached, and to vent the supply of control air to the pressure storage reservoir when the preset carrier elevation is exceeded.

5. The control system of claim 4, wherein the controller further comprises a shut-off valve and a vent valve connected to the pressure storage reservoir.

6. The control system of claim 1, wherein the aircushions have flexible walls and the transmitter is mounted to a wall of one of said air cushions.

7. The control system of claim 1, wherein the controller is operative to respond to changes in load in a continuous manner.

8. The control system of claim 1, wherein the controller is operative to respond to changes in load in a damped manner.

9. The control system of claim 8, wherein the controller damping is adjustable.

10. A control system for an aircushion carrier having a plurality of aircushions for supporting the carrier above a gliding surface, the aircushions to be controllably connected to a source of compressed air, the control system comprising:
    a pressure regulator for controllably supplying air to the aircushions at an operating pressure;
    a transmitter connected to the controller, for sensing a distance between the carrier and the gliding surface, thereby sensing changes in load, the transmitter having a slidable contact having operators thereon, the operators being engaged at preset maximum and minimum distances between the carrier and the gliding surface; and,
    a controller operative to adjust the operating pressure of said pressure regulator in response to changes in load on said carrier, the controller having valves which are engaged by said operators for adjusting the operating pressure.

11. A control system for an air cushion carrier having a plurality of air cushions for supporting the carrier above a gliding surface, the air cushions being controllably connected to a source of compressed air, the control system comprising:
    a pressure regulator for controllably supplying air to the air cushions at an operating pressure;
    a transmitter for sensing a distance between the carrier and the gliding surface, thereby sensing changes in load, the transmitter being arranged to sense deviation from at least one pre-set carrier elevation above the gliding surface;
    a controller operative to adjust the operating pressure of said pressure regulator in response to changes in load on said carrier, the controller being adapted to increase the operating pressure of air supply to the air cushions by increasing the supply of control air to said pressure regulator until the at least one pre-set carrier elevation is reached, and to vent the supply of control air to the pressure regulator when the at least one pre-set carrier elevation is exceeded, the controller having a shut-off valve and a vent valve connected to the control air supply; and
    a damping throttle valve connected to at least one of the vent valve and the shut-off valve, the damping throttle valve being operable to slow changes in pressure of the control air supply to the pressure regulator.

* * * * *